(12) United States Patent
Bailey et al.

(10) Patent No.: US 10,762,052 B2
(45) Date of Patent: Sep. 1, 2020

(54) MULTIPLE AGENT DISTRIBUTED LEDGER ARCHITECTURE

(71) Applicant: Cox Automotive Inc., Atlanta, GA (US)

(72) Inventors: Thomas Glenn Bailey, Atlanta, GA (US); Bruce William Colletti, Atlanta, GA (US)

(73) Assignee: COX AUTOMOTIVE, INC., Atlanta, GA (US)

( * ) Notice: Subject to any disclaimer, the term of this patent is extended or adjusted under 35 U.S.C. 154(b) by 322 days.

(21) Appl. No.: 15/816,380

(22) Filed: Nov. 17, 2017

(65) Prior Publication Data
US 2018/0143995 A1 May 24, 2018

Related U.S. Application Data

(60) Provisional application No. 62/425,456, filed on Nov. 22, 2016.

(51) Int. Cl.
*G06F 16/176* (2019.01)
*G06F 16/27* (2019.01)
(Continued)

(52) U.S. Cl.
CPC ........ *G06F 16/176* (2019.01); *G06F 21/6218* (2013.01); *G06F 21/64* (2013.01); *H04L 9/3236* (2013.01); *G06F 16/219* (2019.01); *G06F 16/2255* (2019.01); *G06F 16/2379* (2019.01); *G06F 16/27* (2019.01); *G06F 16/93* (2019.01); *G06Q 2220/00* (2013.01); *H04L 2209/38* (2013.01)

(58) Field of Classification Search
CPC . H04L 2209/38; G06F 21/64; G06F 16/2379; G06F 16/27; G06F 16/176; G06F 16/219; G06F 16/2255; G06F 16/93
USPC .......................... 707/698, 747, 800, 634, 614
See application file for complete search history.

(56) References Cited

U.S. PATENT DOCUMENTS 10,425,414 B1 * 9/2019 Buckingham ............. G06F 8/61
2006/0190391 A1 8/2006 Cullen et al.
(Continued)

OTHER PUBLICATIONS

International Search Report and Written Opinion for PCT/US2017/062262, dated Feb. 8, 2018 (15 pages).
(Continued)

*Primary Examiner* — Dangelino N Gortayo
(74) *Attorney, Agent, or Firm* — Eversheds Sutherland (US) LLP (57) ABSTRACT

Systems, methods, and computer-readable media are disclosed for an improved database. The systems, methods, and computer-readable media described herein may enhance the response time of databases and improve user experiences. In an example method described herein, a database management system may store, at a first database, a first data block. The first data block may be stored in association with one or more identifiers. The one or more identifiers may include an item identifier for an item associated with the first data block and at least one of a first identifier designating at least a portion of the first data block as public data or privileged data and a second identifier designating at least a portion of the first data block as optional data or mandatory data.

20 Claims, 6 Drawing Sheets

(51) Int. Cl.
*G06F 16/93* (2019.01)
*G06F 16/23* (2019.01)
*G06F 16/21* (2019.01)
*G06F 16/22* (2019.01)
*G06F 21/62* (2013.01)
*G06F 21/64* (2013.01)
*H04L 9/32* (2006.01)

(56) References Cited

U.S. PATENT DOCUMENTS

| | | | |
|---|---|---|---|
| 2017/0041148 A1* | 2/2017 | Pearce | G01S 19/215 |
| 2017/0046669 A1* | 2/2017 | Chow | G06Q 20/3829 |
| 2017/0053460 A1* | 2/2017 | Hauser | G07C 5/008 |
| 2017/0177898 A1* | 6/2017 | Dillenberger | H04L 9/3236 |
| 2018/0005318 A1* | 1/2018 | Pierce | G06Q 40/04 |
| 2018/0091596 A1* | 3/2018 | Alvarez | H04L 67/12 |
| 2018/0097883 A1* | 4/2018 | Chow | G06Q 20/10 |
| 2018/0144340 A1* | 5/2018 | Kinnaird | G06Q 20/3829 |

OTHER PUBLICATIONS

Abeyratne et al., "Blockchain Ready Manufacturing Supply Chain Using Distributed Ledger", International Journal of Research in Engineering and Technology, 2016, vol. 5, Issue 9, pp. 1-10.
Zyskind et al., "Decentralizing Privacy: Using Blockchain to Protect Personal Data", The Institute of Electrical and Electronics Engineers, Inc. (IEEE) Conference Proceedings, 2015, p. 180.

* cited by examiner

MULTIPLE AGENT DISTRIBUTED LEDGER ARCHITECTURE

CROSS-REFERENCE TO RELATED APPLICATIONS

The disclosure claims priority to and the benefit of U.S. provisional patent application No. 62/425,456, filed Nov. 22, 2016, which is incorporated by reference herein in its entirety.

BACKGROUND

Distributed ledgers, also known as blockchains or block chain, are records of ownership of an item of value that is geographically synchronized and replicated across numerous locations without using central data storage or administration. The records may be referred to as blocks that are securely added, or appended, to the distributed ledger under a consensus mechanism involving one or more parties, participants, or agencies. This may ensure that no corruption, revision, or removal of any block can occur. A new block may be linked to the previous block via a hash mechanism that safeguards the immutability of the block and the history of the blockchain sequence. Consensus trust attributes for adding blocks may include a permissioned attribute which requires prior identification of the parties or agents involved in the transaction. Consensus trust attributes for adding blocks may also include permissionless attribute, according to which the distributed ledger does not require past association with the transacting parties or agents. Some distributed ledgers also include smart contracts that are self-executing, self-enforcing code that implement agreements or additional transactions whenever the appropriate contractual conditions are met.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF VARIOUS EMBODIMENTS

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

II. EXEMPLARY SYSTEM ARCHITECTURE

Figure 1:
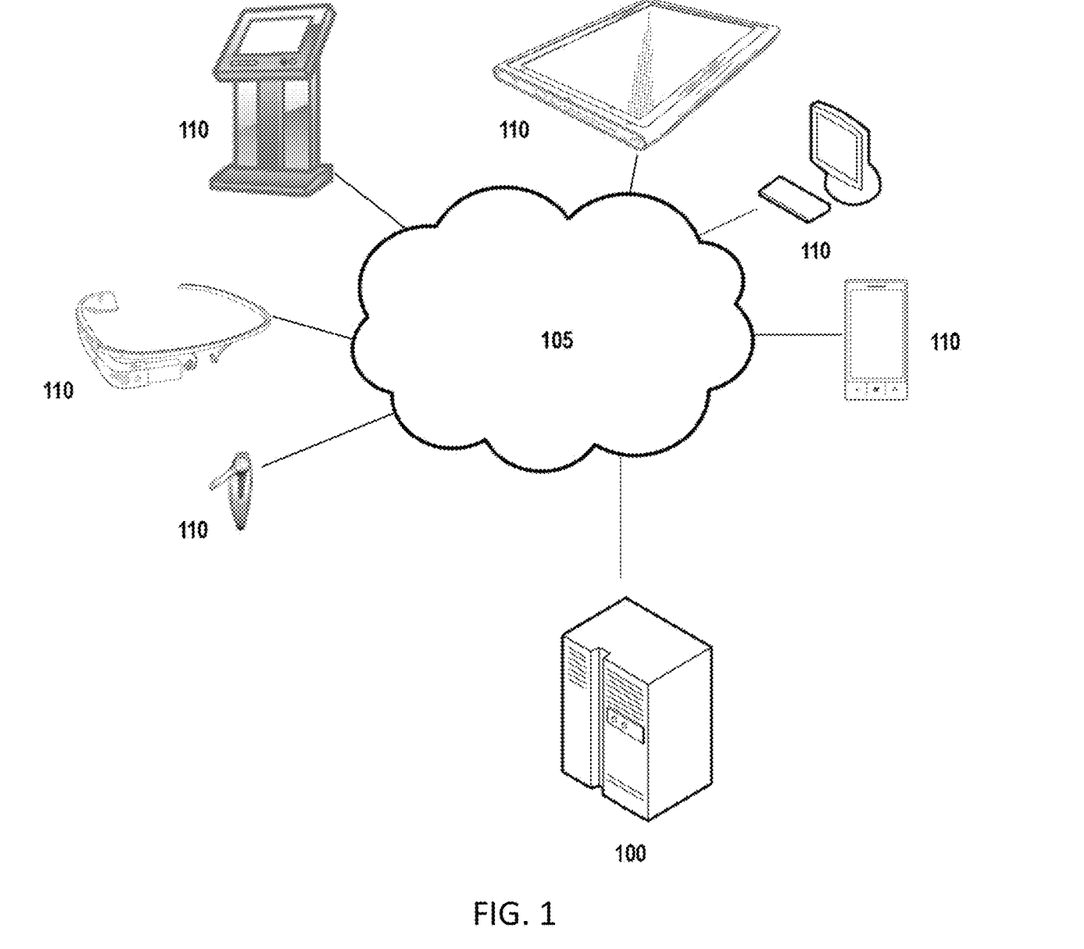
FIG. 1 is an overview of a system in accordance with one or more embodiments of the disclosure.

FIG. 1 provides an illustration of an exemplary embodiment of the present disclosure. As shown in FIG. 1, this particular embodiment may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

Figure 2:
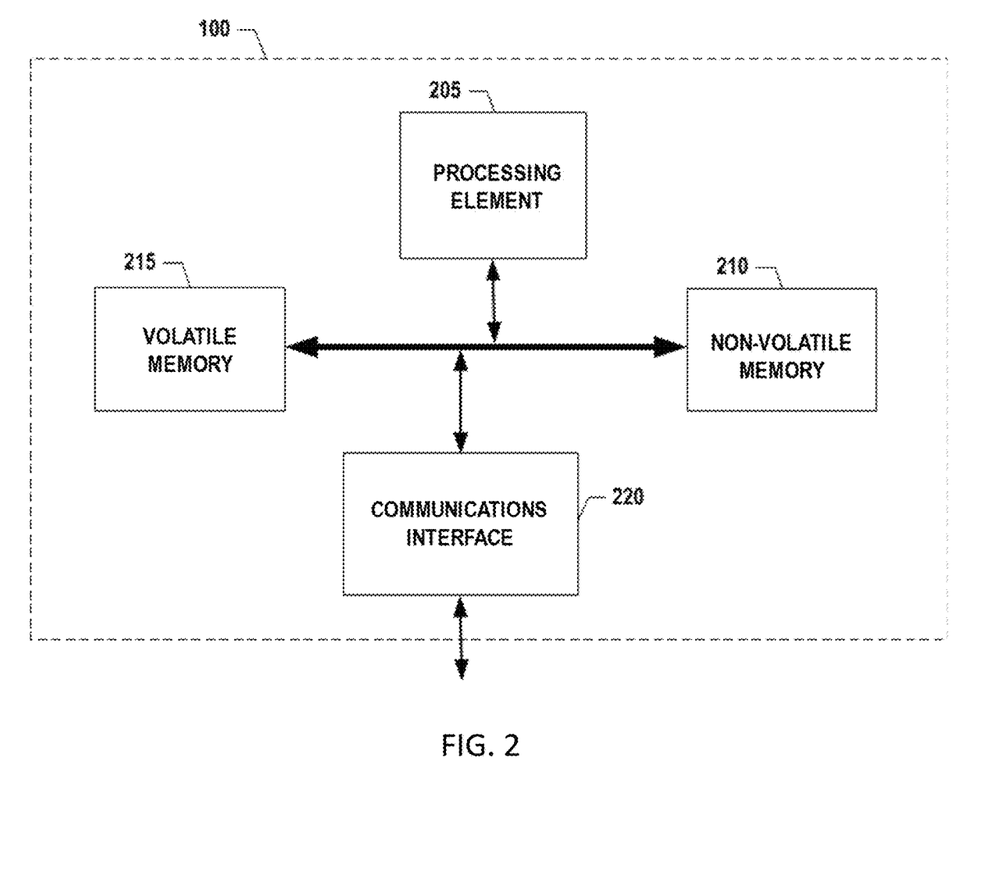
FIG. 2 is an exemplary schematic diagram of a management computing entity in accordance with one or more embodiments of the disclosure.

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 520 for communicating with various computing entities, such as by communicating data, content, information, and/or similar terms used herein interchangeably that can be transmitted, received, operated on, processed, displayed, stored, and/or the like. For instance, the carrier computing entity 100 may communicate with user computing entities 110 and/or a variety of other computing entities.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers.

Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
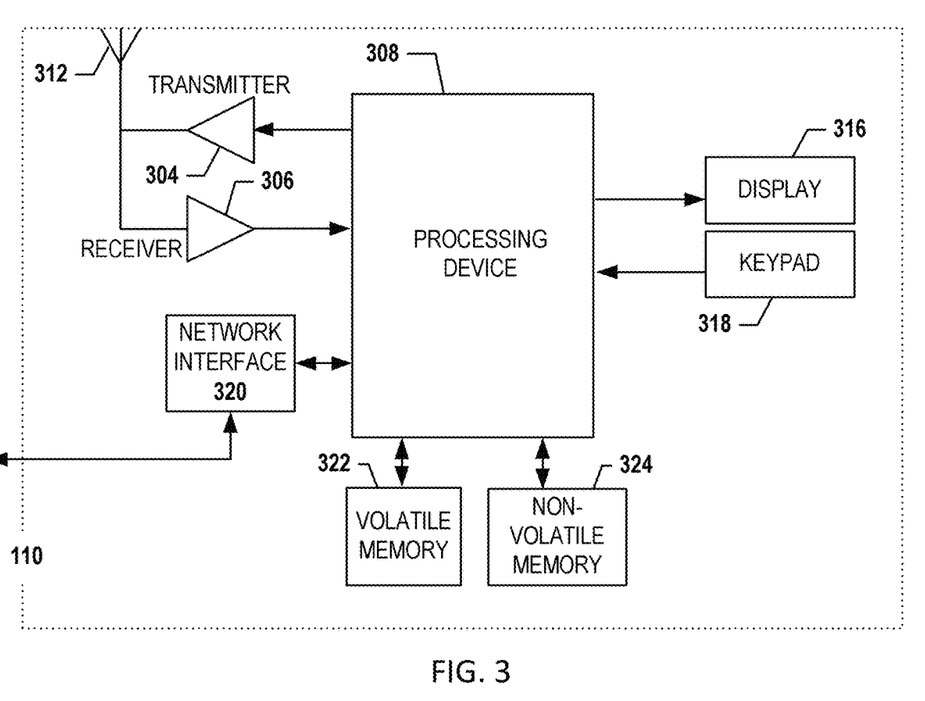
FIG. 3 is an exemplary schematic diagram of a user computing entity in accordance with one or more embodiments of the disclosure.

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity 110 that includes one or more components that are functionally similar to those of the carrier computing entity 100. FIG. 3 provides an illustrative schematic representative of a user computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

III. EXEMPLARY SYSTEM OPERATION

Illustrative embodiments will now be described more fully hereinafter with reference to the accompanying drawings, in which some, but not all embodiments of the disclosure may be shown. The disclosure may be embodied in many different forms and should not be construed as limited to the embodiments set forth herein; rather, these embodiments are provided so that this disclosure will satisfy applicable legal requirements. As noted above, like numbers refer to like elements throughout. As described above, the management computing entity 100 and/or user computing entity 110 may be configured perform the operations described herein.

Some or all of the above features of a distributed ledger may be addressed by certain embodiments of the disclosure. The term agent may be used to illustrate a distinct and unique private individual, a for-profit or non-profit corporation, a government agency, a public or private association or organization, a research or educational establishment, a bank or other financial institution and/or, any other possible participant that may engage in a transaction that either changes, or validates, the state of an item of value in a distributed ledger. The term consensus mechanism may be used to describe the specific agent, or distinct groups of multiple agents, protocols, procedures, processes, logic, and/or conditions that are both necessary and sufficient to change the state of an item of value in a distributed ledger by appending a new block to the blockchain. Certain embodiments may include single agents, or separate and distinct groups of multiple agents, using unique consensus mechanisms for appending blocks to the distributed ledger. Other embodiments can feature permissionless or permissioned trust attributes within the consensus mechanism. According to one embodiment of the disclosure, different trust attributes may be assigned to different agents within the same consensus mechanism. The term smart contract may be used henceforth to describe automated, self-executing software, within the distributed ledger and blockchain environment, to create and enforce contractual obligations and commitments between two or more agents. In some implementations, different and unique smart contracts can be assigned to different agents within the consensus mechanism. In other embodiments, smart contracts can be assigned based on trust attributes of the agent. In some implementations, in addition to self-execution and self-enforcement of a contract, a smart contract can simultaneously create one or more secondary smart contracts with separate and unique criteria for future self-execution and implementation. Certain embodiments may also include dynamic smart contracts that adjust the price, terms, logic, and conditions of the smart contract based on the state-of-execution of other smart contracts.

According to another embodiment of the disclosure, each consensus mechanism may assign separate and unique authorizations (e.g., append and/or read authorizations) to the distributed ledger for each participating agent. In some implementations, a certain consensus mechanism allows a single agent (i.e., financial institution) to append a block assigning a certain artifact containing relevant information to the distributed ledger's item of value (e.g., car loan lien, including amount, payment schedule, status), whereas another single agent (i.e., any privileged individual) may only read that a lien has been assigned and its payout status, without having access to loan details. In other implementations, multiple agents (i.e., state government title office, buyer, and seller) may append a block transferring title of the distributed ledger's item of value from the seller to the buyer, whereas some multiple agents (i.e., insurance providers, state government revenue department) may read all relevant details (i.e., names and locations of buyer and seller) while another single agent (i.e., any privileged individual) may only read that a certain type of title transfer occurred.

In some implementations, individual agents within a unique consensus mechanism may have different trust attributes. Certain embodiments may require a permissioned trust attribute for an agent (i.e., state government title office) to append a block for transferring title of the distributed ledger's item of value, and a permissionless trust attribute to read an owner type (i.e., corporate, individual, government). In other embodiments, multiple agents may have a permissioned trust attribute to append a block for financial liens on the distributed ledger's item of value, of which any of those agents can individually append separately.

Further, according to another embodiment of the disclosure, smart contracts may employ advanced predictive or prescriptive algorithms as part of the contractual logic in the self-executing, self-enforcing code. Certain embodiments may contain portfolio optimization algorithms that append additional blocks to the distributed ledger representing the purchase or sale of other instances of the distributed ledger's items of value on behalf of single or multiple agents. Other implementations of smart contracts may contain forecasting algorithms that execute the purchase or sale of services related to the distributed ledger's item of value that occur outside the blockchain.

Certain embodiments of the disclosure are directed to, among other things, distributed ledger architectures. Distributed ledger technology employs a blockchain, an immutable, sequential record of transactions on, or changes in the state of, a specific item of value over a geographically disperse computer network without using a central authority. Items of value may include, but are not limited to, tangible property, real estate, copyrights, patents, intellectual property, corporate charters, economic identities, and cryptocurrencies such as Ethereum and Bitcoin. For example, automotive vehicle ownership and title transfers may be managed through a distributed ledger, providing the entire transaction history, state changes, and life cycle of a vehicle from manufacture to salvage and disposal. In some embodiments, the Original Equipment Manufacturer (OEM) could initiate a blockchain by including specific vehicle make, model, and features (build data), the Vehicle Identification Number (VIN), date of manufacture, initial distribution (retail dealer, fleet, rental, lease, etc.). From there, intermediaries could add data about further distributions and any modifications made to the vehicle (aftermarket parts and the like). Upon sale to a retail consumer, appended blocks could include insurance, maintenance, title transfer, taxes, registration, finance, other vehicle history events, odometer and other condition criteria, etc. New data would be added to the distributed ledger through appended blocks until such time that the vehicle is retired and scrapped. In this way, the blockchain acts like a biography of the vehicle.

Figure 4:
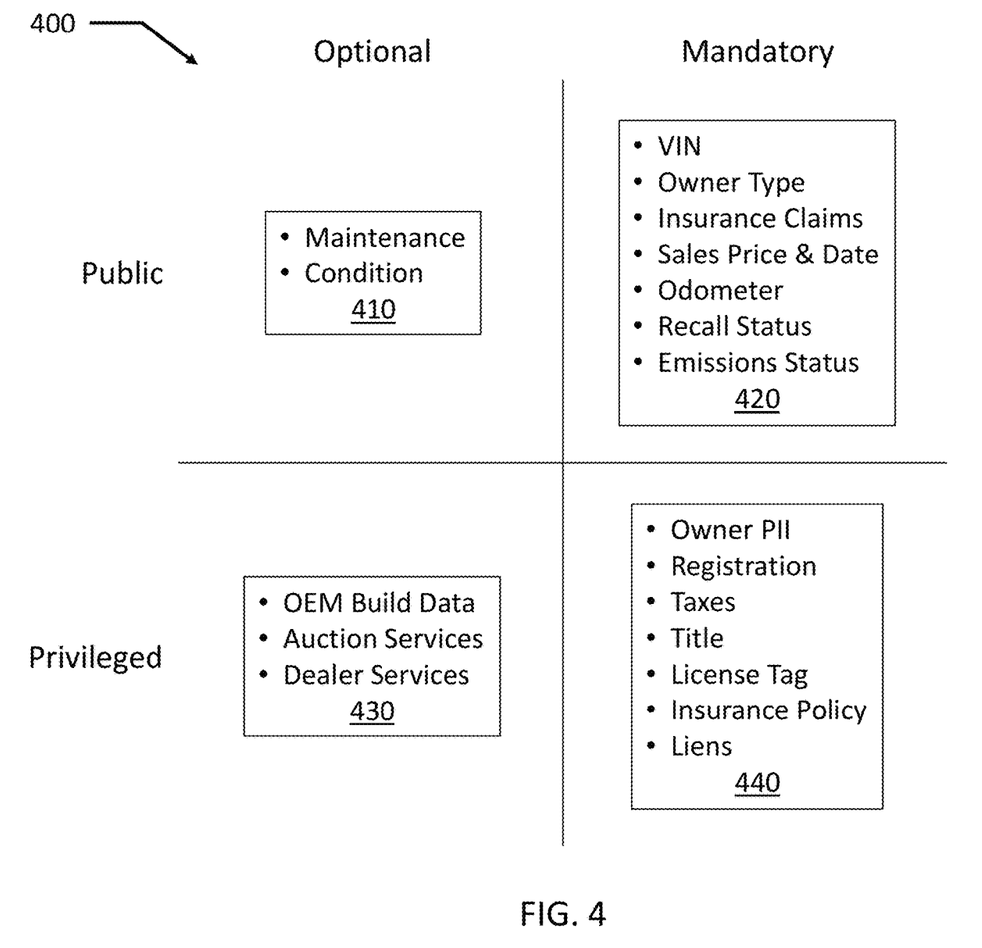
FIG. 4 depicts an example architecture classifying the elements of a distributed ledger's item of value using taxonomy in accordance with one or more embodiments of the disclosure.

FIG. 4 illustrates an example of Public-Privileged|Optional-Mandatory distributed ledger taxonomy architecture using automotive vehicles as the item of value. In some embodiments, the intersection of the Public-Privileged|Optional-Mandatory categories provide four distinct cells 410, 420, 430, and 440 that collectively contain all the possible data elements that can be contained within each block, and that are necessary to describe the state of the vehicle. In certain embodiments, examples of Privileged agents include both government agencies, such as law enforcement, tax revenue, and title services; and, legal entities such as OEMs, insurance companies, and wholesale auction services. The distinguishing feature of Privileged cells 430 and 440 is that they contain restricted information such as Personal Identifiable Information (PII), confidential information, or proprietary data regarding competitive products and services. For example, Taxes in 440 would include sales or ad valorem payables and receipts, or confidential wholesale services and pricing in 430.

In some embodiments examples of public agents include legal entities or individuals providing or receiving non-proprietary or commodity services, or government agencies and legal entities providing special information in a non-PII or unrestricted format. The distinguishing feature of public cells 410 and 420 is that they contain non-PII, open data or information that serves a public good. For example, recall status serves the public good of safe transportation and consumer protection.

In some embodiments Mandatory represents data and information that is required to be appended to the blockchain if the generating event or transaction occurs. The distinguishing feature of "mandatory" cells 420 and 440 is that they contain open, non-PII and confidential or PII data, respectively, that is required to be part of the distributed ledger if that data was ever created or made available. For example, any transfer of ownership of a vehicle requires appending a new block to the blockchain containing all available and relevant data elements in 420 and 440.

In some embodiments "optional" represents information that is appended to the blockchain if an agent, or groups of agents, choose to include the relevant data when the generating event or transaction occurs. The distinguishing feature of Optional cells 410 and 430 is that they contain open, non-PII and confidential or PII data, respectively, that becomes part of the distributed ledger only if so decided at the discretion of an agent, or group of agents. For example, as part of a leasing agreement the financial agent may require that all maintenance done on the vehicle be appended to the blockchain in 430 for the duration of the lease.

In some embodiments, any single element, or combination of elements, within a given cell 410, 420, 430, or 440 can constitute a block to be appended to the blockchain. For example, transportation provided by an auction service in 430 can constitute a separate block without including OEM build data or dealer services. Using the same example, transportation and reconditioning provided by an auction service in 430 can be included together in the same block, but separate from other blocks having data elements from 410, 420, or 440.

In some embodiments, elements in one cell can be derived from elements in a different cell and thus included in the same block to be appended to the blockchain. For example, the consensus mechanism for a privileged agent, or group of privileged agents, for transfer of title would mandate including the new owner's Personal Identifiable Information (PII) as part of some or all of the elements in 440. However, the owner type in 420 can be derived from the owner PII in 440, and thus included in the same block. In a similar fashion, odometer in 420 can be derived from registration in 440, and thus included in the same block.

In some embodiments, Privileged access to multiple items of value can be granted to a single agent. For example, a financial institution may have Privileged access to data in cell 440 for vehicles in the distributed ledger that it has financed. In other embodiments, Privileged access to a single item of interest may be granted to a single agent. For example, a private individual may have privileged access to data in cell 440 for the vehicle the individual holds title to. In some embodiments, privileged access may be removed on one or more items of interest as a result of change in status. For example, a private individual may lose privileged access to data in cell 440 for the vehicle the individual just sold. In another example, all agents having privileged access to data in cells 430 and 440 may lose that access when a vehicle reaches a state of salvage status and is scrapped.

Figure 5:
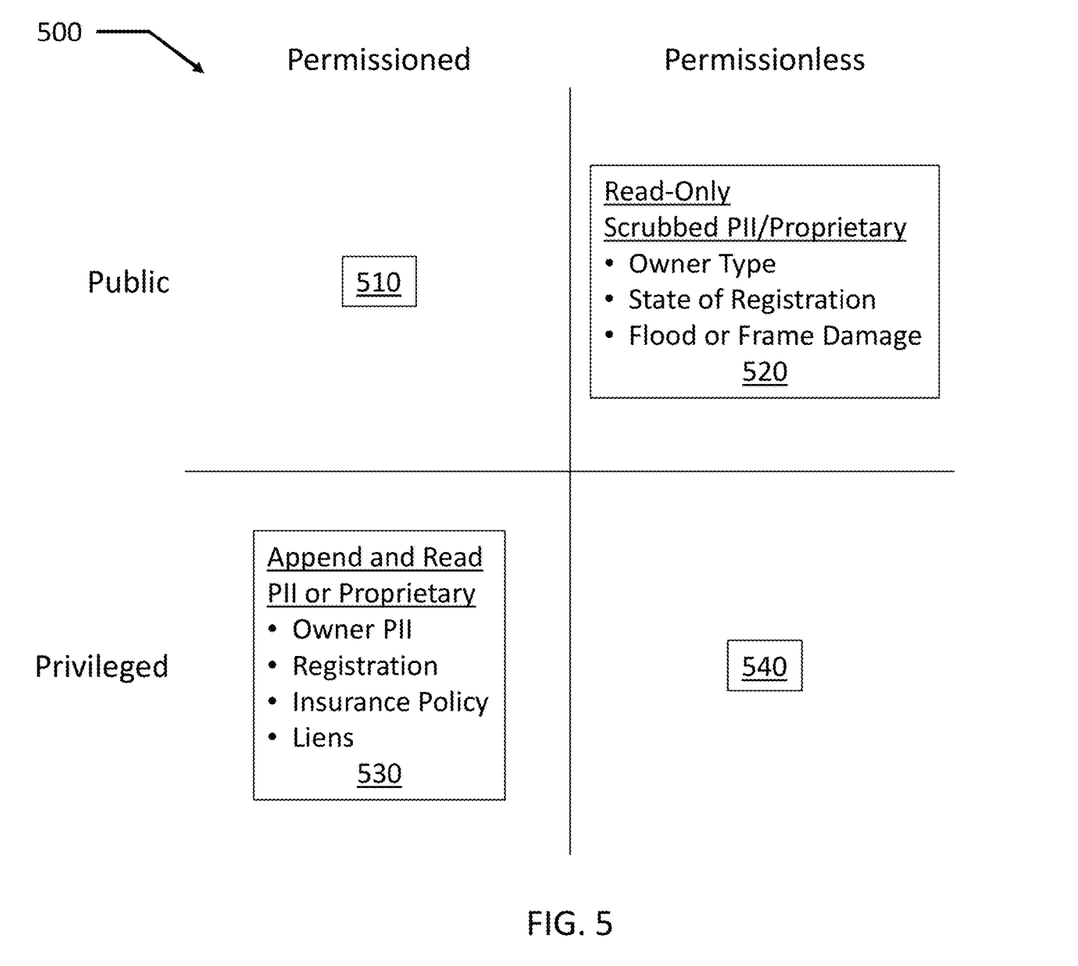
FIG. 5 depicts an example architecture classifying the elements of a distributed ledger's item of value using taxonomy in accordance with one or more embodiments of the disclosure.

Certain embodiments of the disclosure are directed to, among other things, a public-privileged and/or permissioned-permissionless distributed ledger taxonomy architecture. Referring to FIG. 5, the Permissioned category identifies agents having both append and read activities whose consensus trust attributes require prior identification and authorization by the distributed ledger of the agent, or group of agents, involved in the block transaction. Conversely, the Permissionless category identifies an agent, or groups of agents, having read-only activities whose consensus trust attributes do not require past association with the distributed ledger. Privileged includes both government agencies, such as law enforcement, tax revenue, and title services; and, legal entities such as OEMs, insurance companies, and wholesale auction services. Public can also include legal entities, or private individuals, providing or receiving non-proprietary or commodity services, or government agencies and legal entities providing or receiving special information in a non-PII format.

In some embodiments employing automotive vehicles as the item of value, the intersection of the Public-Privileged-|Permissioned-Permissionless categories provide two distinct cells 520 and 530 that collectively contain all possible agent and consensus mechanism combinations for reading or appending blocks to the distributed ledger. Further, in some embodiments the Permissioned category may rescind or update the consensus mechanism for the agent, or group of agents, conducting append or read activities with the distributed ledger. In other embodiments, as part of a current append process the Permissioned category may grant append or read authorization to a new agent, or group of agents, which may then constitute trust credentials for subsequent append or read activities with the distributed ledger. Further, in some embodiments the Permissionless category retains no memory of an agent's, or group of agents', read activities with the distributed ledger. In other embodiments, one or more characteristics, features, or identities of the agent, or group of agents, in the Permissionless category conducting read activities with the distributed ledger may themselves be retained by the distributed ledger as a new block.

In some embodiments cell 520 represents those consensus mechanisms whose trust attributes allow Permissionless features for a Public agent, or group of agents, to read a distributed ledger block. The distinguishing feature of cell 520 is that it allows any registered or unregistered Public agent access to specific, limited non-PII data. For example, in some embodiments a web portal, data aggregator, or research institution would have read access to vehicle information containing just the first ten digits of the VINs (i.e., year, make and model data only) in conjunction with 5-digit level ZIP code registration. In other embodiments an individual purchasing a used car could have read access to basic vehicle history (e.g., flood damage, frame damage) for a specific, full 17-digit VIN.

In some embodiments cell 530 represents those consensus mechanisms whose trust attributes require Permissioned features for a Privileged agent, or group of agents, to append or read a distributed ledger block. The distinguishing feature of cell 530 is that it allows a registered Permissioned agent, or group of agents, append and read authorization for PII or proprietary data or information. For example, in some embodiments law enforcement agencies would have complete Permissioned read access to vehicle owner and registration information. In other embodiments, registered insurance agencies would have Permissioned append and read access for detailed vehicle coverage and claim history.

In some embodiments cell 540 represents those consensus mechanisms whose trust attributes allow Permissionless features for a Privileged agent, or group of agents.

In some embodiments cell 510 represents those consensus mechanisms whose trust attributes require Permissioned features for a Public agent, or group of agents, to append or read a distributed ledger block.

In some embodiments self-executing and self-enforcing smart contracts may be implemented within this Public-Privileged|Optional-Mandatory|Permissioned-Permissionless framework. For example, auction dealer services in cell 430 of FIG. 4, such as auction-to-dealer transportation, assurance products, or reconditioning, could be executed the moment the vehicle is purchased by the dealer. In some implementations, tax payments, registration fees, or other contractual elements in cell 440 of FIG. 4 could be executed using smart contracts.

In other embodiments, the smart contract would be considered a Permissioned agent that would document the change of state and associated artifacts by appending a block to the distributed ledger. For example, a smart contract for a wholesale assurance product could have a consensus mechanism to append a block to the distributed ledger showing the terms and conditions of an active return policy. In some implementations, the execution of a Permissioned smart contract would provide the legal artifacts, such as title registration, for use outside of the distributed ledger.

In other embodiments, the smart contract would be considered a Permissionless agent, whose self-execution relies solely on a derivative change of state and does not require appending a block to the distributed ledger.

In some embodiments, the smart contract could self-enforce certain conditions and modifications to the consensus mechanisms of an agent, or group of agents. For example, in some implementations OEMs could enforce, through smart contracts, a desired hierarchy of buyer privileges (e.g., first special franchise dealerships, then all franchise dealerships, then any franchised dealer of similar vehicles, then any franchised dealer, then finally any dealer) during the remarketing process for a returned lease vehicle. In other embodiments, smart contract modifications of consensus mechanisms would self-adjust based on the state of the vehicle, or during certain points in time.

In some embodiments, dynamic smart contracts can be employed that adjust the price, terms, logic, and conditions of the smart contract based on the state-of-execution of other smart contracts. For example, portfolio management for vehicle purchases of a buyer can be implemented through dynamic smart contracts that modify the terms of future purchases based on the current state of the portfolio and status of existing smart contracts.

In some embodiments, the self-execution of a smart contract could be a precondition for the instantiation of other smart contracts. For example, a smart contract that creates a wholesale assurance product, whereby the dealer can return a vehicle purchased at auction back to the auction for a refund, could instantiate a new, secondary smart contract that creates a retail assurance product that allows a retail consumer to return the vehicle. In other embodiments, such secondary or tertiary smart contracts can have customized terms, conditions, and logic based on the state in which the primary smart contract was self-executed. For example, a primary wholesale assurance smart contract can have the same price, terms and conditions for two distinct dealers, but create different secondary retail assurance products for each of them based on their unique retail market risks.

Figure 6:
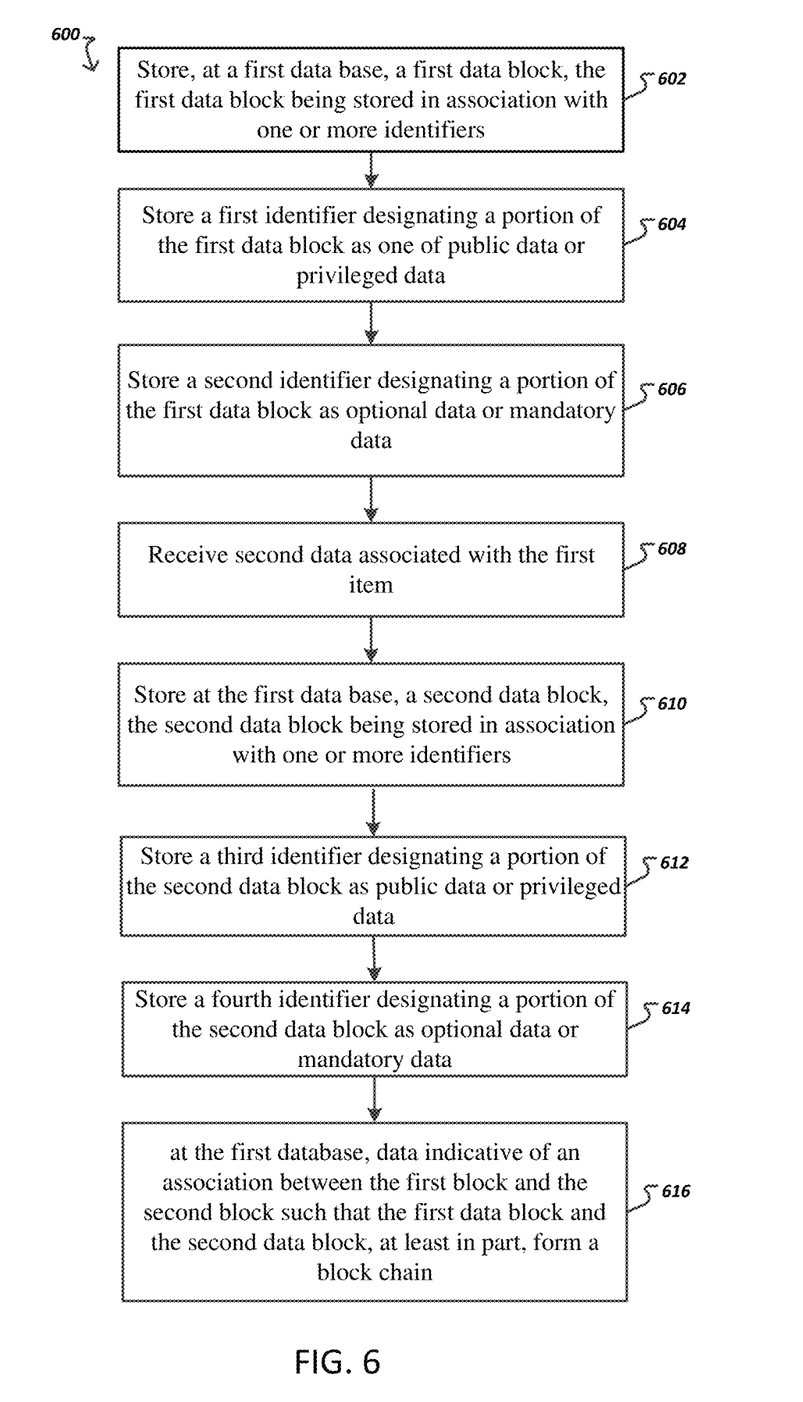
FIG. 6 is flowcharts illustrating various procedures and operations that may be completed in accordance with one or more embodiments of the disclosure.

FIG. 6 is a flow chart of process 600 in accordance with one or more embodiments of the disclosure. Steps 602, 604, 606, 608, 610, 612, 614, and 616 depict steps similar to the steps discussed above with reference to FIGS. 4 and 5.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

IV. ADDITIONAL IMPLEMENTATION DETAILS

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A method, comprising:
storing at a first database, a first data block, the first data block being stored in association with one or more identifiers, wherein the one or more identifiers comprise a first identifier for first data associated with the first data block and a second identifier for second data associated with the first data block, wherein the first identifier designates the first data as public data and the second identifier designates the second data as privileged data;
storing at the first database, a second data block, the second data block being stored in association with one or more identifiers, wherein the one or more identifiers comprise a third identifier for third data associated with the second data block and a fourth identifier for fourth data associated with the second data block, wherein the third identifier designates the third data as public data and the fourth identifier designates the fourth data as privileged data; and
storing at the first database, data indicative of an association between the first data block and the data second block such that the first data block and the second data block, at least in part, form a block chain.

2. The method of claim 1, further comprising:
receiving, from a first user device associated with an account of a first user having public access privileges, a request to view particular data from the block chain;
determining one or more identifiers associated with the particular data;
identifying one or more data blocks from the block chain that are stored in association with one or more identifiers designating the one or more data blocks as public data; and
providing, to the first user device and based on the one or more identifiers designating the one or more data blocks as public data, at least a portion of the one or more data blocks from the block chain.

3. The method of claim 2, further comprising:
identifying one or more second data blocks from the block chain that are stored in association with one or more identifiers designating the one or more second data blocks as privileged data; and
providing, to the first user device and based on the one or more identifiers designating the one or more data blocks as privileged data, a message indicative of lack of privilege to access at least a portion of the particular data.

4. The method of claim 1, further comprising:
receiving, from a second user device associated with an account of a second user having privileged access privileges, a request to view particular data from the block chain;
determining one or more identifiers associated with the particular data;
identifying one or more data blocks from the block chain that are stored in association with one or more identifiers designating the one or more data blocks as privileged data; and
providing, to the second user device, at least a portion of one or more data blocks from the block chain.

5. The method of claim 1, wherein the first data is stored in association with a mandatory identifier.

6. The method of claim 1, wherein the second data is also stored in association with an optional identifier.

7. The method of claim 1, wherein the first data and second data is associated with an automobile.

8. The method of claim 5, wherein the first data block comprises transactional data for an automobile.

9. The method of claim 6, wherein the second data block comprises a maintenance record for an automobile.

10. A system, comprising:
at least one processor;
at least one memory storing computer-readable instructions, that when executed by the at least one processor, cause the at least one processor to:
store at a first database, a first data block, the first data block being stored in association with one or more identifiers, wherein the one or more identifiers comprise a first identifier for first data associated with the first data block and a second identifier for second data associated with the first data block, wherein the first identifier designates the first data as public data and the second identifier designates the second data as privileged data;
store at the first database, a second data block, the second data block being stored in association with one or more identifiers, wherein the one or more identifiers comprise a third identifier for third data associated with the second data block and a fourth identifier for fourth data associated with the second data block, wherein the third identifier designates the third data as public data and the fourth identifier designates the fourth data as privileged data; and store at the first database, data indicative of an association between the first data block and the data second block such that the first data block and the second data block, at least in part, form a block chain.

11. The system of claim 10, further comprising computer-executable instructions that cause the at least one processor to:
receive, from a first user device associated with an account of a first user having public access privileges, a request to view particular data from the block chain;
determine one or more identifiers associated with the particular data;
identify one or more data blocks from the block chain that are stored in association with one or more identifiers designating the one or more data blocks as public data; and
provide, to the first user device and based on the one or more identifiers designating the one or more data blocks as public data, at least a portion of the one or more data blocks from the block chain.

12. The system of claim 11, further comprising computer-executable instructions that cause the at least one processor to:
identify one or more second data blocks from the block chain that are stored in association with one or more identifiers designating the one or more second data blocks as privileged data; and
provide, to the first user device and based on the one or more identifiers designating the one or more data blocks as privileged data, a message indicative of lack of privilege to access at least a portion of the particular data.

13. The system of claim 10, further comprising computer-executable instructions that cause the at least one processor to:
receive, from a second user device associated with an account of a second user having privileged access privileges, a request to view particular data from the block chain;
determine one or more identifiers associated with the particular data;
identify one or more data blocks from the block chain that are stored in association with one or more identifiers designating the one or more data blocks as privileged data; and
provide, to the second user device, at least a portion of one or more data blocks from the block chain.

14. The system of claim 10, wherein the first data is stored in association with a mandatory identifier.

15. The system of claim 10, wherein the second data is stored in association with an optional identifier.

16. The system of claim 10, wherein the first data and second data is associated with an automobile.

17. The system of claim 14, wherein the first data block comprises transactional data for an automobile.

18. The system of claim 15, wherein the second data block comprises a maintenance record for an automobile.

19. A method, comprising:
storing at a first database, a first data block, the first data block being stored in association with one or more identifiers, wherein the one or more identifiers comprise a first identifier for first data associated with the first data block and a second identifier for second data associated with the first data block, wherein the first identifier designates the first data as public data and the second identifier designates the second data as privileged data;
storing at the first database, a second data block, the second data block being stored in association with one or more identifiers, wherein the one or more identifiers comprise a third identifier for third data associated with the second data block and a fourth identifier for fourth data associated with the second data block, wherein the third identifier designates the third data as public data and the fourth identifier designates the fourth data as privileged data; and
storing at the first database, data indicative of an association between the first data block and the data second block such that the first data block and the second data block, at least in part, form a block chain,
wherein the first data is stored in association with a mandatory identifier,
wherein the first data comprises transactional data for an automobile,
wherein the second data is stored in association with an optional identifier, and
wherein the second data comprises a maintenance record for an automobile.

20. The method of claim 19, further comprising:
receiving, from a first user device associated with an account of a first user having public access privileges, a request to view particular data from the block chain;
determining one or more identifiers associated with the particular data;
identifying one or more data blocks from the block chain that are stored in association with one or more identifiers designating the one or more data blocks as public data;
providing, to the first user device and based on the one or more identifiers designating the one or more data blocks as public data, at least a portion of the one or more data blocks from the block chain;
identifying one or more second data blocks from the block chain that are stored in association with one or more identifiers designating the one or more second data blocks as privileged data; and
providing, to the first user device and based on the one or more identifiers designating the one or more data blocks as privileged data, a message indicative of lack of privilege to access at least a portion of the particular data.

* * * * *